United States Patent
Sheets et al.

(10) Patent No.: US 7,314,556 B2
(45) Date of Patent: Jan. 1, 2008

(54) FILTER DISC WITH PANEL SECTORS

(75) Inventors: Keith Sheets, Cantonment, FL (US); Mark Entz, Montgomery, PA (US); Gregory R. Kohler, Williamsport, PA (US)

(73) Assignee: Andritz Inc., Glens Falls, NY (US)

( * ) Notice: Subject to any disclaimer, the term of this patent is extended or adjusted under 35 U.S.C. 154(b) by 429 days.

(21) Appl. No.: 10/917,633

(22) Filed: Aug. 13, 2004

(65) Prior Publication Data

US 2005/0121381 A1 Jun. 9, 2005

Related U.S. Application Data

(60) Provisional application No. 60/527,483, filed on Dec. 5, 2003.

(51) Int. Cl.
*B01D 25/00* (2006.01)

(52) U.S. Cl. .................. 210/331; 210/345; 210/346; 210/486; 210/232

(58) Field of Classification Search ............. 210/331, 210/309, 374, 365, 167.19, 203, 209, 211, 210/227, 228, 230, 232, 272, 493.5, 494.2, 210/498, 520, 486; 33/327; 266/182.8; 229/107

See application file for complete search history.

(56) References Cited

U.S. PATENT DOCUMENTS

| | | | | |
|---|---|---|---|---|
| 2,395,225 A | * | 2/1946 | Kurz ......................... | 210/486 |
| 2,696,916 A | * | 12/1954 | Peterson et al. ............ | 210/236 |
| 3,471,026 A | * | 10/1969 | Riker ......................... | 210/327 |
| 3,482,702 A | * | 12/1969 | Edwards ...................... | 210/406 |
| 3,485,376 A | * | 12/1969 | Lynn et al. ................. | 210/331 |
| 3,643,803 A | * | 2/1972 | Glos, II ...................... | 210/232 |
| 3,659,716 A | * | 5/1972 | Peterson et al. ............ | 210/247 |
| 4,159,951 A | * | 7/1979 | Davis ......................... | 210/331 |
| 4,162,982 A | * | 7/1979 | Chesner ...................... | 210/486 |
| 4,216,094 A | * | 8/1980 | Solum ......................... | 210/331 |

(Continued)

OTHER PUBLICATIONS

GL&V Centerdisc CDI brochure, dtd. 2001.

*Primary Examiner*—David Sample
*Assistant Examiner*—Delilah P Ardiente
(74) *Attorney, Agent, or Firm*—Alix, Yale & Ristas, LLP (57) ABSTRACT

A panel sector, for a disc filter for separation of liquids from a suspension, includes front and back filter panel assemblies, a sector assembly for mounting the front and back filter panel assemblies, and a top cap for retaining the filter panel assemblies within the sector assembly. Each of the filter panel assemblies includes a frame and a filter material clamped by the frame. The sector assembly includes an outer end plate, an inner core mounting plate subassembly for mounting the panel sector to the disc filter core, first and second side channel subassemblies, at least one structural member extending radially between the core mounting plate subassembly and the outer end plate, and at least one support member extending laterally between the first and second side channel subassemblies. The core mounting plate subassembly and each of the side channel subassemblies have front and back channels for receiving portions of the frame. The top cap first and second end portions are removably mountable to the outer end plate of a one of the sector assemblies and the outer end plate of an adjacent sector assembly, respectively.

27 Claims, 11 Drawing Sheets

U.S. PATENT DOCUMENTS

| | | | |
|---|---|---|---|
| 4,293,411 A * | 10/1981 | Davis | 210/178 |
| 4,695,381 A | 9/1987 | Ragnegard | 210/403 |
| 5,258,120 A * | 11/1993 | Knodel et al. | 210/232 |
| 5,792,352 A | 8/1998 | Scheucher et al. | 210/331 |
| 6,231,761 B1 | 5/2001 | Mohlin et al. | 210/232 |

* cited by examiner

Prior Art

Fig. 17

FILTER DISC WITH PANEL SECTORS

The present application claims priority to provisional application Ser. No. 60/527,483, filed Dec. 5, 2003.

BACKGROUND OF THE INVENTION

This invention relates generally to filters for separation of liquids from suspensions. More particularly, the present invention relates to disc filters for separation of liquids from suspensions, in particular fiber stock suspensions, having several filter elements which include a frame over which a filter medium is mounted.

In one type of conventional disc filter, the filter includes a filter vat containing the suspension to be filtered and a substantially tubular filter core, or rotor. Sector-shaped filter elements are held by radially extending holding devices and guides that are fixed to the filter core. These filter elements could also be fixed to a disc filter with a rotor. The filter element includes a frame having frame portions including a neck that could be flared or straight, along the leading and trailing edges, and at the radially outer side. The filter media is a porous bag that is shrunk onto the frame, thereby defining the two outer filtration surfaces of the filter element. The bag is fixed at the lower end by holding plates. The sector-shaped filter elements are slid radially inward into the guides and the individual filter elements are connected to each other at the outer circumference by holding devices. Accordingly, the filter elements are relatively cumbersome and heavy and may only be replaced during relatively long machine shutdowns. In addition, the entire filter media must be replaced if either of the filtration surfaces is damaged.

SUMMARY OF THE INVENTION

Briefly stated, the invention in a preferred form is a panel sector for a disc filter for separation of liquids from a suspension. The disc filter is rotatable about a filter axis, divided into multiple sectors, and includes a substantially tubular filter core or rotor. The filter core has a core wall defining an axially extending core channel, multiple core inlet fittings, and multiple core filtrate channels extending axially through the core wall from the core inlet fittings to the core channel. Each panel sector comprises front and back filter panel assemblies, a sector assembly for mounting the front and back filter panel assemblies, and a top cap for retaining the filter panel assemblies within the sector assembly. Each of the filter panel assemblies includes a frame and a filter material clamped by the frame. The sector assembly includes a radially outer, outer end plate, a radially inner, core mounting plate subassembly for mounting the panel sector to the disc filter core, first and second side channel subassemblies, at least one structural member extending radially between the core mounting plate subassembly and the outer end plate, and at least one support member extending laterally between the first and second side channel subassemblies. The core mounting plate subassembly has front and back channels for receiving portions of the frames of the front and back filter panel assemblies, respectively. Each of the side channel subassemblies has front and back channels for receiving portions of the frames of the front and back filter panel assemblies, respectively. The top cap includes oppositely disposed first and second end portions and first and second halve portions. The top cap first end portion is removably mountable to the outer end plate of a one of the sector assemblies and the top cap second end portion is removably mountable to the outer end plate of an adjacent sector assembly. The first and second halve portions each have front and back channels. The front and back channels of the first half portion receive portions of the frames of the front and back filter panel assemblies, respectively, mounted in the one of the sector assemblies and the front and back channels of the first half portion receive portions of the frames of the front and back filter panel assemblies, respectively, mounted in the adjacent sector assembly.

The filter material may include a sheet of filter fabric and a sheet of expanded material positioned on the downstream side of the filter fabric sheet to provide support to the filter fabric sheet. The expanded material sheet is a web composed of a metal or a polymeric material forming openings. Alternatively, the filter material may include only a stiffened filter fabric.

The top cap is U-shaped, having a base, a first leg and a second leg defining a cavity. A second half portion of the outer end plate of the one of the sector assemblies is received within the cavity of the end cap first half portion, to form the front and back channels, respectively, of the end cap first half portion; and a first half portion of the outer end plate of the adjacent sector assembly is received within the cavity of the end cap second half portion, to form the front and back channels, respectively, of the end cap second half portion.

The sector assembly also includes first and second threaded studs that extend radially outward from the outer end plate on either side of the center of the outer end plate. Each panel sector further comprises first and second nuts that are threadably mountable on the first and second threaded studs, respectively. The base of the first and second end portions of each top cap defines an opening for receiving a one of the threaded studs.

The core mounting plate subassembly includes a core mounting plate having a central opening. The core mounting plate is mounted to the disc filter core such that the central opening provides fluid communication with a one of the core inlet fittings. The core mounting plate subassembly also includes front and back shrouds that extend radially outward from an inner end, mounted to the core mounting plate, to an outer portion. The outer portions of the front and back shrouds each have inner and outer segments forming a shoulder on each of the shrouds. The radially inner portion of the structural member extend between the outer segments and are mounted to the inner segments. The structural member and the shoulders and outer segments of the front and back shrouds define the front and back channels.

The sector assembly includes multiple structural members and a front pair of support members and a back pair of support members. Each of the support members may have a zig-zag shape forming inner and outer bend portions. Each of the support members extends radially between the core mounting plate subassembly and the outer end plate and extends laterally from a one of the side channel subassemblies to a position substantially equidistant from both side channel subassemblies.

The support members are received in notches in the front surfaces of the back pair of structural members and notches in the back surfaces of the front pair of structural members. Preferably, the front surfaces of the structural members and the front surfaces of the front pair of support members are substantially co-planar and the back surfaces of the structural members and the back surfaces of the back pair of support members are substantially co-planar. Each of the structural members and each of the support members has a radially outer end mounted to the outer end plate and a radially inner portion mounted to the core mounting plate subassembly.

Each of the side channel subassemblies includes U-shaped inside and outside channel members, with the inside channel member mounted within the outside channel member. The front legs of the inside and outside channel members defining the front channel and the back legs of the inside and outside channel members defining the back channel. Inner and outer end portions of the inside channel member extend radially beyond the outside channel member. The inner end portion of the inside channel member of each side channel subassembly is mounted to the core mounting plate subassembly and the outer end portion of the inside channel member of each side channel subassembly is mounted to the outer end plate.

BRIEF DESCRIPTION OF THE DRAWINGS

The present invention may be better understood and its numerous objects and advantages will become apparent to those skilled in the art by reference to the accompanying drawings in which:

FIG. 16 is an enlarged front view of the filter element of FIG. 15; and

DETAILED DESCRIPTION OF THE PREFERRED EMBODIMENT

In one type of conventional disc filter 10 (FIGS. 15 and 16), the filter 10 includes a filter vat 12 containing the suspension to be filtered, a substantially tubular filter core 14, and optionally a hood 16. Sector-shaped filter elements 18 are held by radially extending holding devices and guides 20 that are fixed to the filter core 14. The filter core 14 has core inlet fittings 22 which are integral with or affixed to the core and lead radially to the core filtrate channels 24, which extend axially through the core. Discharge fittings 26 of the filter elements are slid into these inlet fitting(s). The filter rotates about the core axis in the direction of the arrow 28, whereby the discharge fitting 26 of the filter element 18 is the last part of the filter element to emerge from the suspension, preventing the filtrate from flowing backward, away from core 14.

Figure 15:
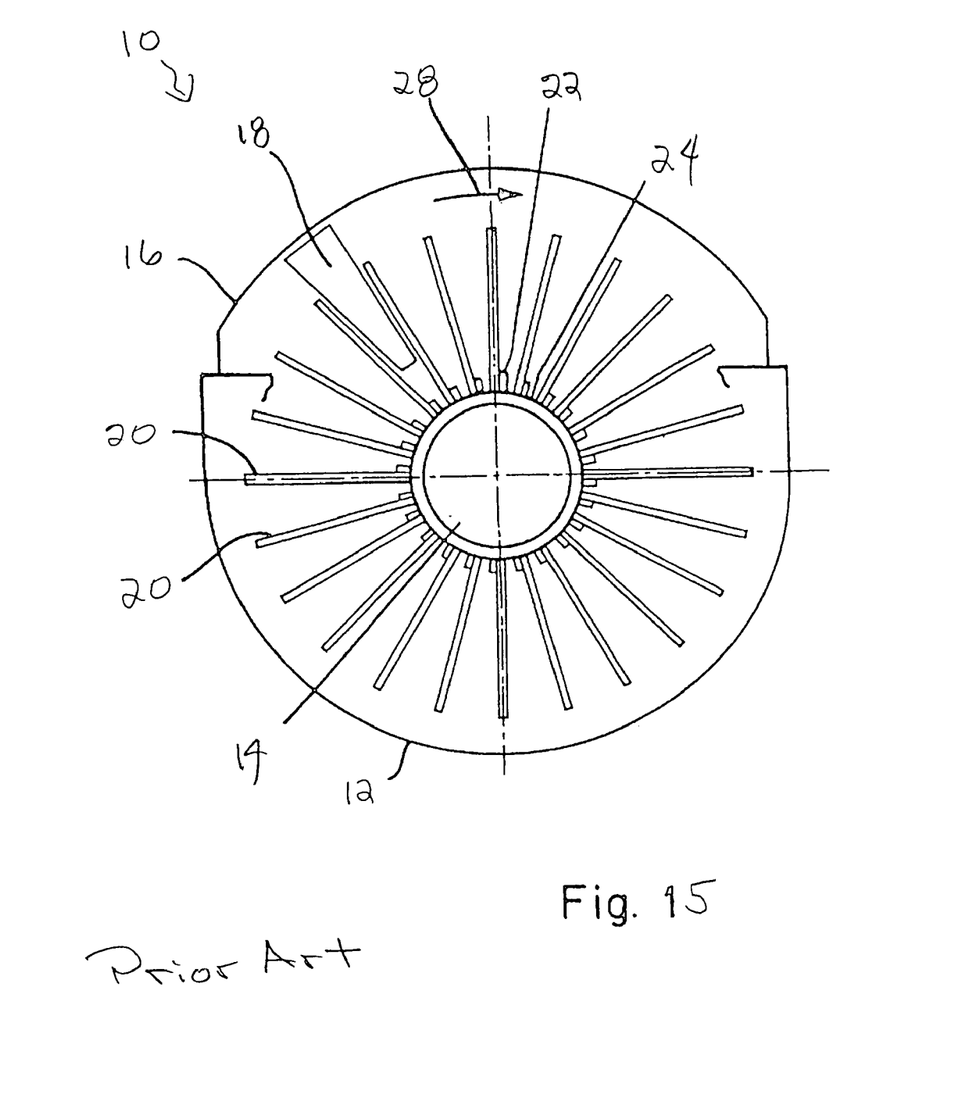
FIG. 15 is front view of a conventional disc filter.

The filter element 18 comprises a frame 30 to which spaced apart plates 32 are mounted. Each element 18 has frame portions along the leading and trailing edges, and at the radially outer side. The filter media in the form of a porous bag or the like, is shrunk onto the frame 30 and defines the two outer filtration surfaces of the filter element. The bag is fixed at the lower end which faces the filtrate discharge, using holding plates. These holding plates serve at the same time as covers for the core filtrate channels required for filtrate discharge. The sector-shaped filter elements 18 are slid radially inward into the guides 20 and the individual filter elements are connected to each other at the outer circumference by holding devices 34.

With reference to FIGS. 1-14 wherein like numerals represent like parts throughout the figures, a panel sector in accordance with the present invention is generally designated by the numeral 40. The sector assembly 42, filter panel assemblies 44 and top cap 46 comprising the panel sector 40 may be back-fitted into conventional disc filters 10 or utilized in new construction disc filters.

Figure 1:
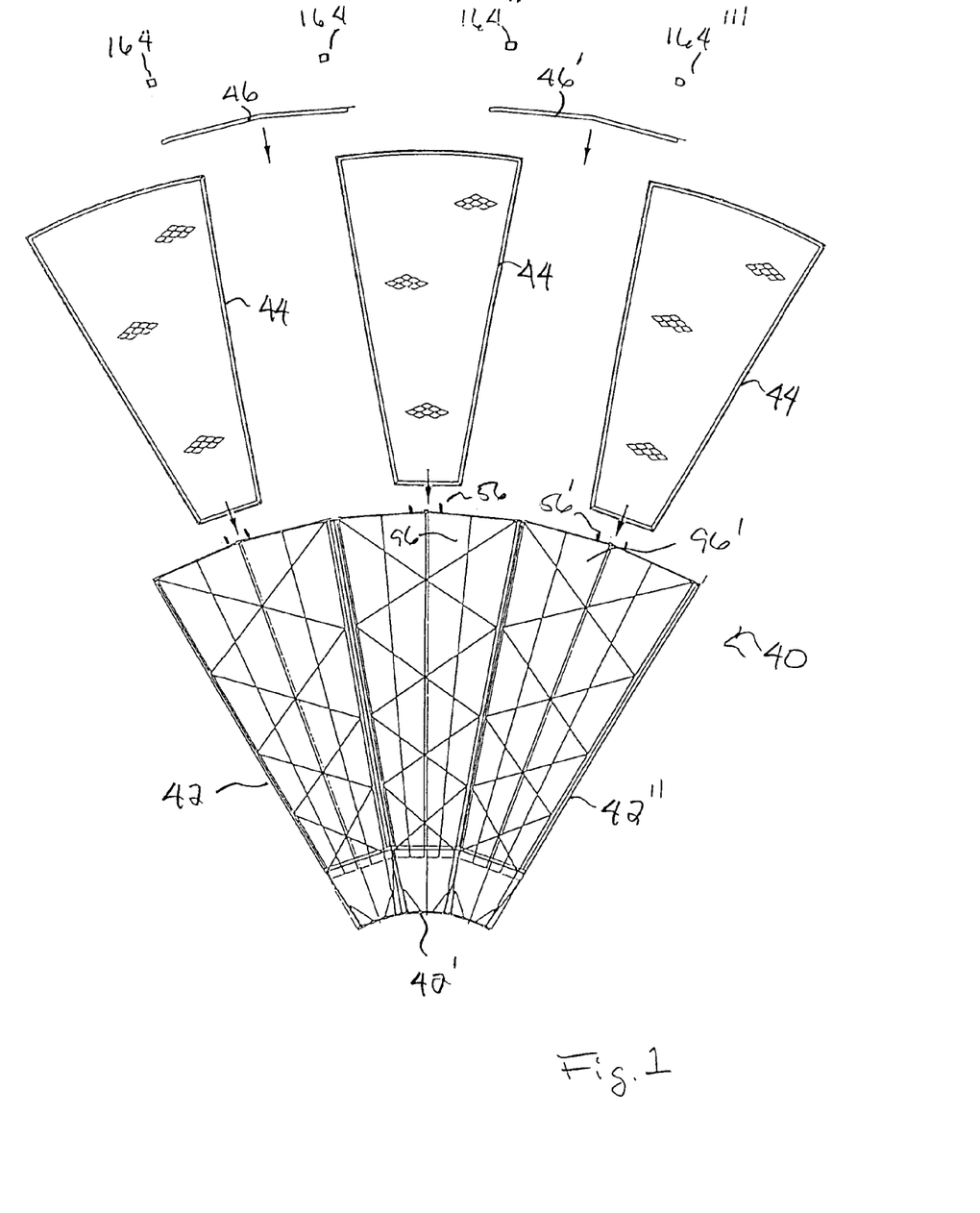
FIG. 1 is an exploded view of a portion of a filter having sector assemblies, filter panel assemblies, and top caps in accordance with the subject invention.
Figure 2:
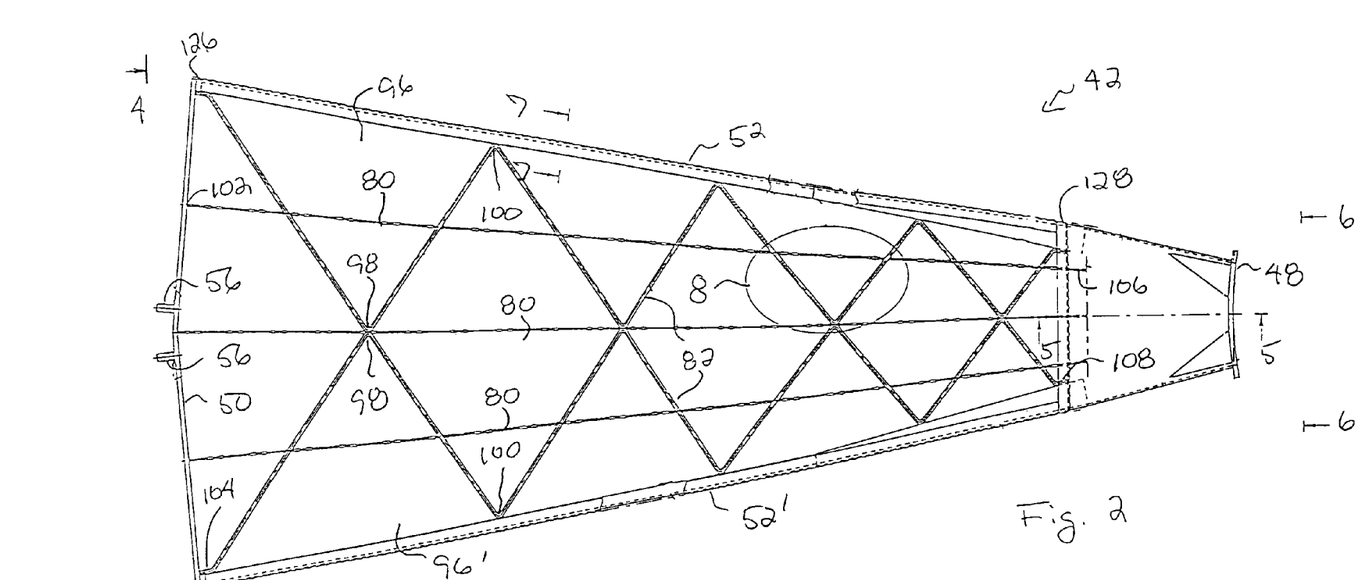
FIG. 2 is an enlarged front view of one of the sector assemblies of FIG. 1.
Figure 3:
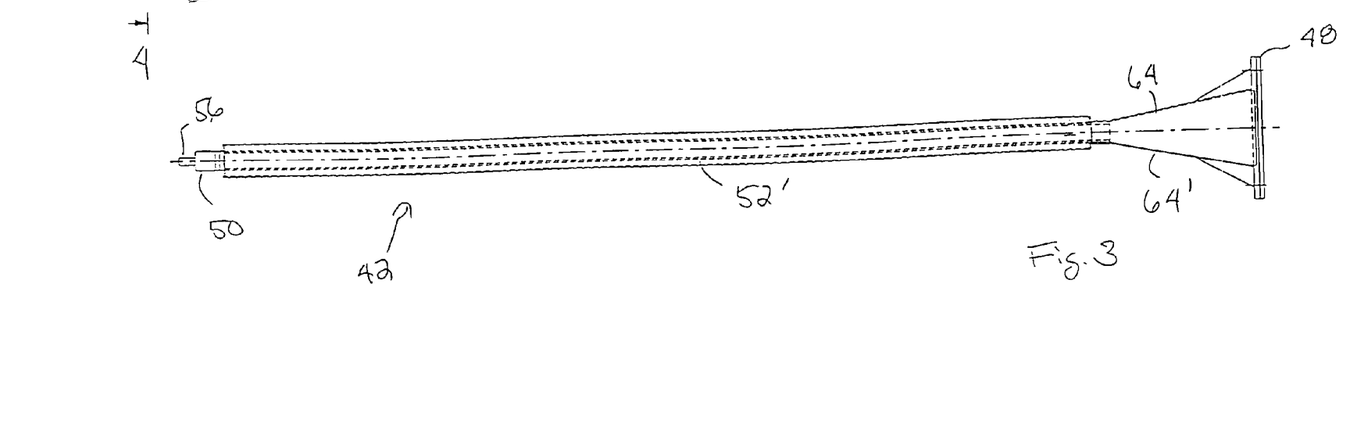
FIG. 3 is a side view of the sector assembly of FIG. 2.
Figure 4:
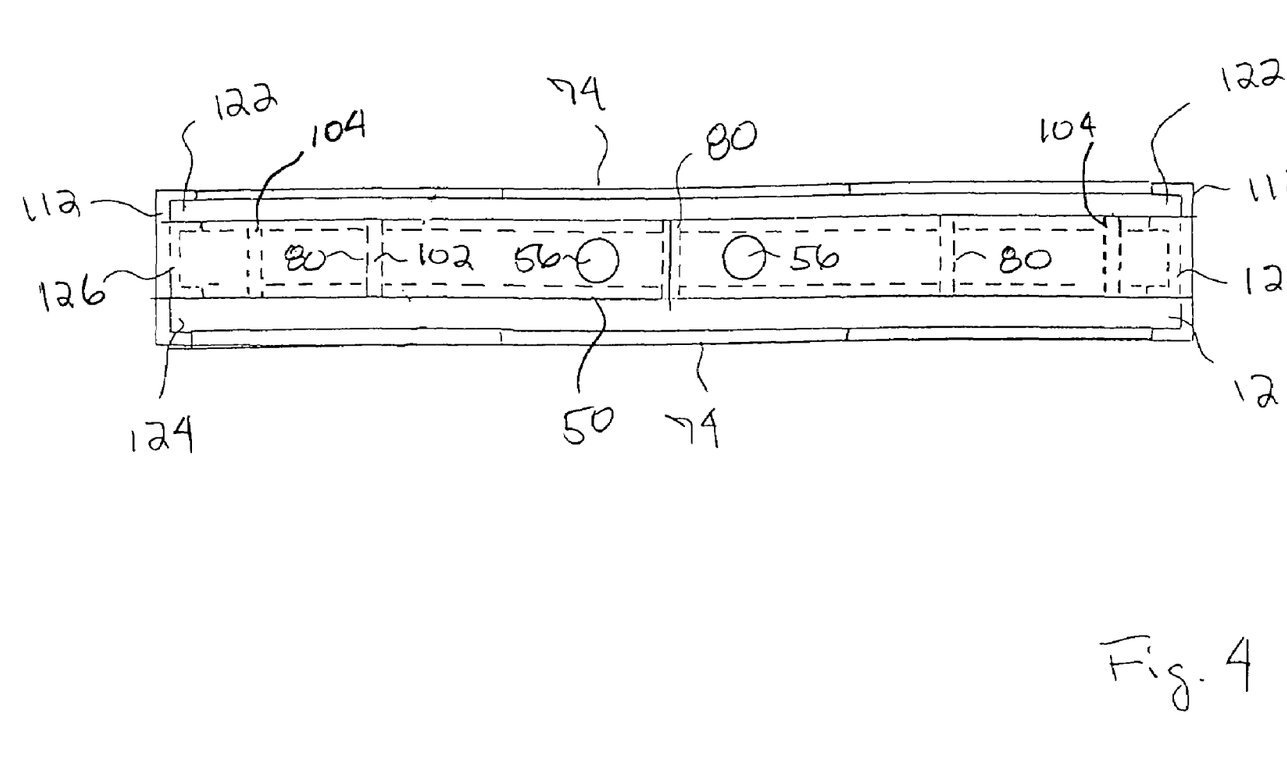
FIG. 4 is an enlarged end view, taken along line 4-4 of FIG. 2.
Figure 5:
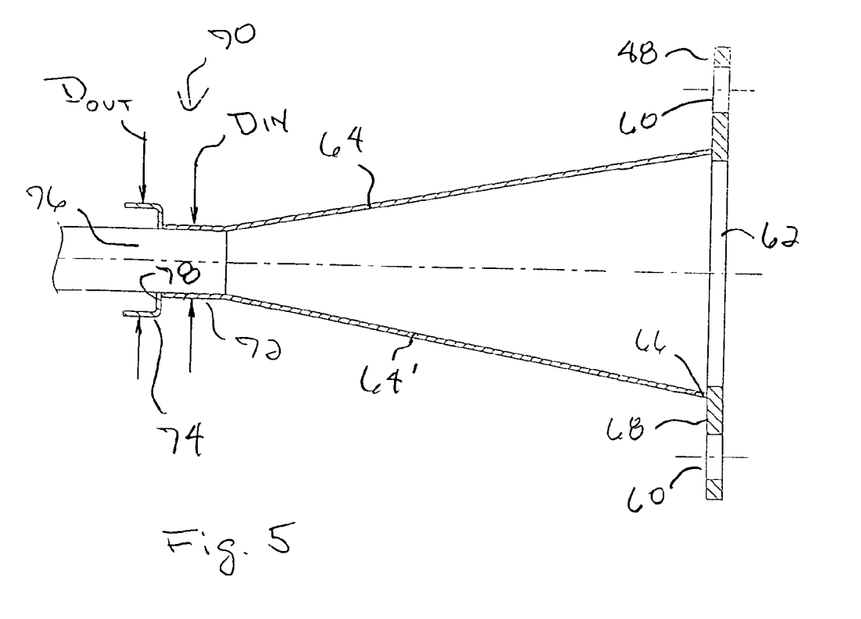
FIG. 5 is an enlarged sectional view, taken along line 5-5 of FIG. 2.
Figure 6:
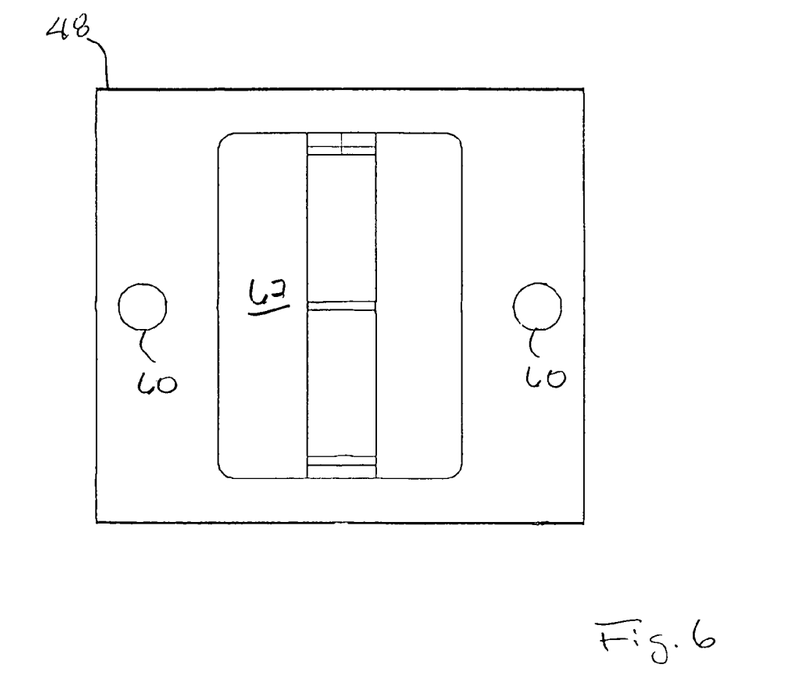
FIG. 6 is an enlarged end view, taken along line 6-6 of FIG. 2.

Each panel sector 40 includes a sector assembly 42, two filter panel assemblies 44, and a top cap 46. The sector assembly 42 is a sturdy open deck framework having a periphery formed by a radially inner, core mounting plate 48, a radially outer, outer end plate 50, and first and second side channel subassemblies 52, 52'. The peripheral components of the sector assembly 42 provide channels for mounting the filter panel assemblies. The outer end plate 50 (FIG. 12) of each sector assembly 42 is bent at the center 54, forming an angle α such that the outer perimeter of the sector assemblies 42 in an assembled filter approximates a circle. A threaded stud 56 extends radially outward from the outer face 58 of the outer end plate 50 on either side of the center 54.

The core mounting plate 48 (FIGS. 5 and 6) has multiple openings 60 for attaching the sector assembly 42 to the core and a central opening 62 to provide a passage for the flow of filtrate/suspension. Front and back shrouds 64, 64' extending radially outward from an inner end 66, mounted to the outer surface 68 of the core mounting plate 48, to an outer portion 70 having inner and outer segments 72, 74. The front and back shrouds 64, 64' form a space 76 therebetween, where the distance $D_{OUT}$ between the shroud 64, 64's in the outer segment 74 is greater than the distance $D_{IN}$ between the shrouds 64, 64' in the inner segment 72, forming a shoulder 78 on each of the shrouds 64, 64'.

The interior components of the sector assembly 42 include multiple structural members 80 that extend radially between the outer portions 70 of the front and back shrouds 64, 64' and the outer end plate 50. The structural members 80 are sandwiched between a front pair of support members 82 and a back pair of support members 84. Notches 86 in the front and back surfaces 88, 90 of the structural members 80 receive the support members 82, 84 such that the front surfaces 88 of the structural members 80 and the front surface 92 at the front pair of support members 82 are substantially co-planar and the back surfaces 90 of the structural members 80 and the back surface 94 of the back pair of support members 84 are substantially co-planar. Each of the support members 82, 84 has a zig-zag shape, extending radially between the outer portions 70 of the front and back shrouds 64, 64' and the outer end plate 50 and extending laterally across a half 96, 96' of the sector assembly 42, having inner and outer bend portions 98, 100. Each of the structural members 80 and the support members 82, 84 has a radially outer end 102, 104 mounted to the outer end plate 50 and a radially inner portion 106, 108 disposed within space 76 and mounted to the inner segments 72 of the front and back shrouds 64, 64'.

Figure 7:
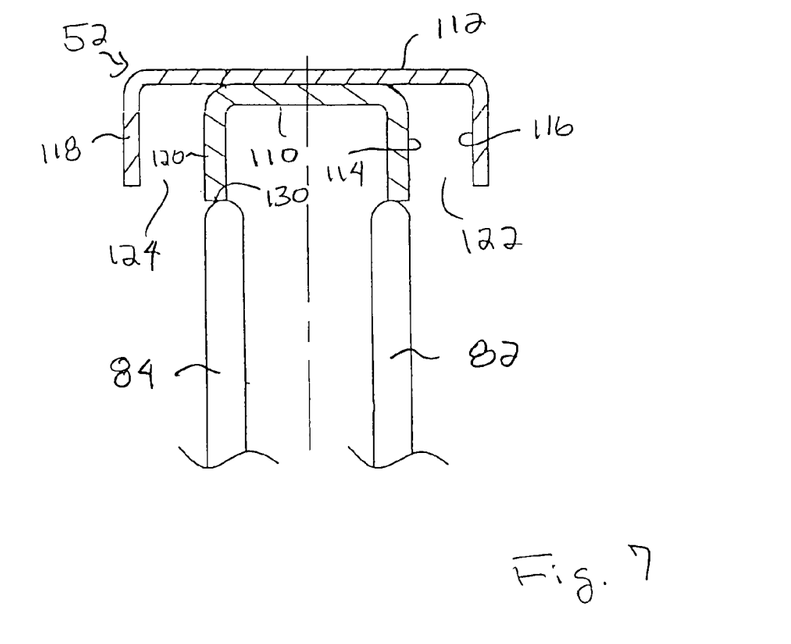
FIG. 7 is an enlarged sectional view, taken along line 7-7 of FIG. 2.
Figure 8:
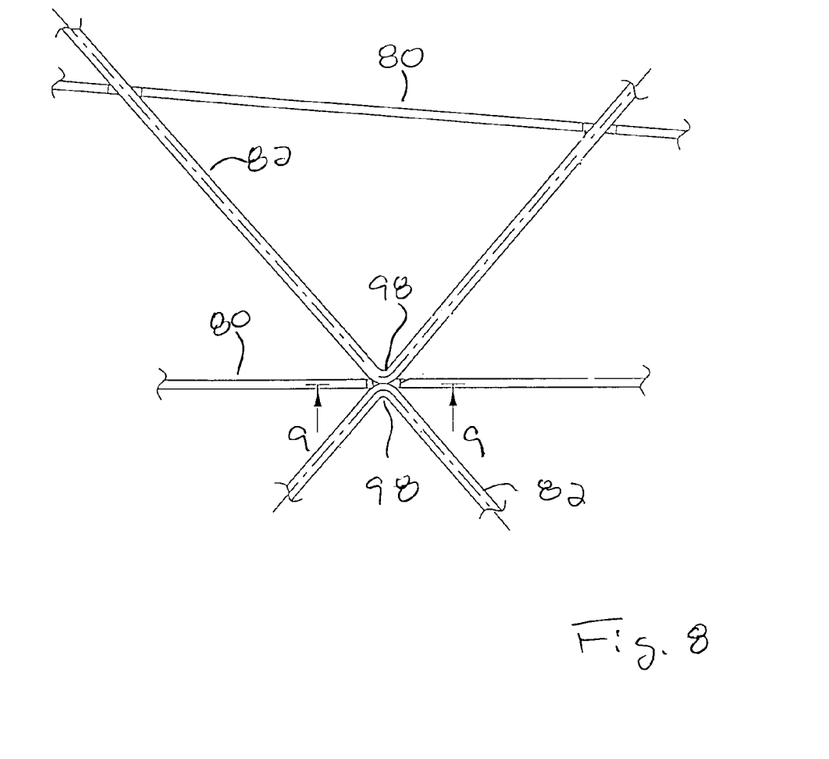
FIG. 8 is an enlarged side view of area 8 of FIG. 2.
Figure 9:
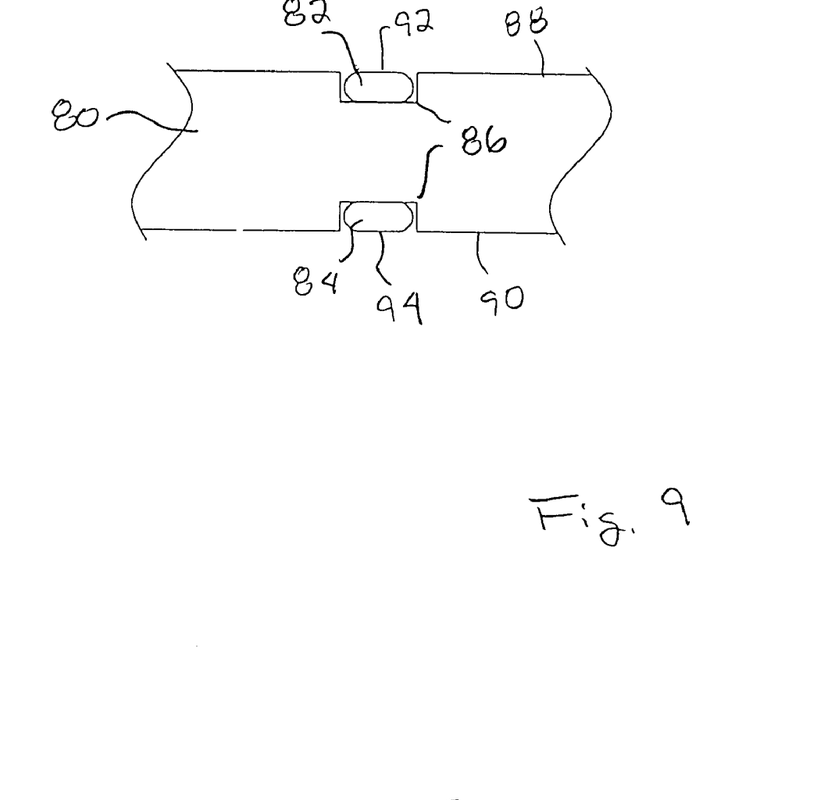
FIG. 9 is an enlarged sectional view, taken along line 9-9 of FIG. 8.

With reference to FIG. 7, each of the side channel subassemblies 52 includes U-shaped inside and outside channel members 110, 112. The inside channel member 110 is mounted within the outside channel member 112, with the outer surface 114 of the base of the inside channel member 110 contacting the inner surface 116 of the base of the outside channel member 112. The inside and outside channel members are substantially coaxial, the inner surfaces 116 of the legs 118 of the outside channel member 112 and the outer surfaces 114 of the legs 120 of the inside channel member 110 forming front and back channels 122, 124. The radial length of the inside channel member 110 is greater than the radial length of the outside channel member 112, such that an outer end portion 126 of the inside channel member 110 extends radially outward beyond the radially outer end of the outside channel member 112 and an inner end portion 128 of the inside channel member 110 extends radially inward beyond the radially inner end of the outside channel member 112. The inner end portion 128 of each side channel subassembly 52 is disposed within space 76 and mounted to the inner segments 72 the front and back shrouds 64, 64'. The outer end portion 126 of each side channel subassembly 52 is mounted to the outer end plate 50. In addition, the radially outer ends 104, the radially inner portions 108, and the outer bend portions 100 of the support members 82, 84 are mounted to the inner ends 130 of the legs 120 of the associated inside channel member 110.

Figures 13, 14:
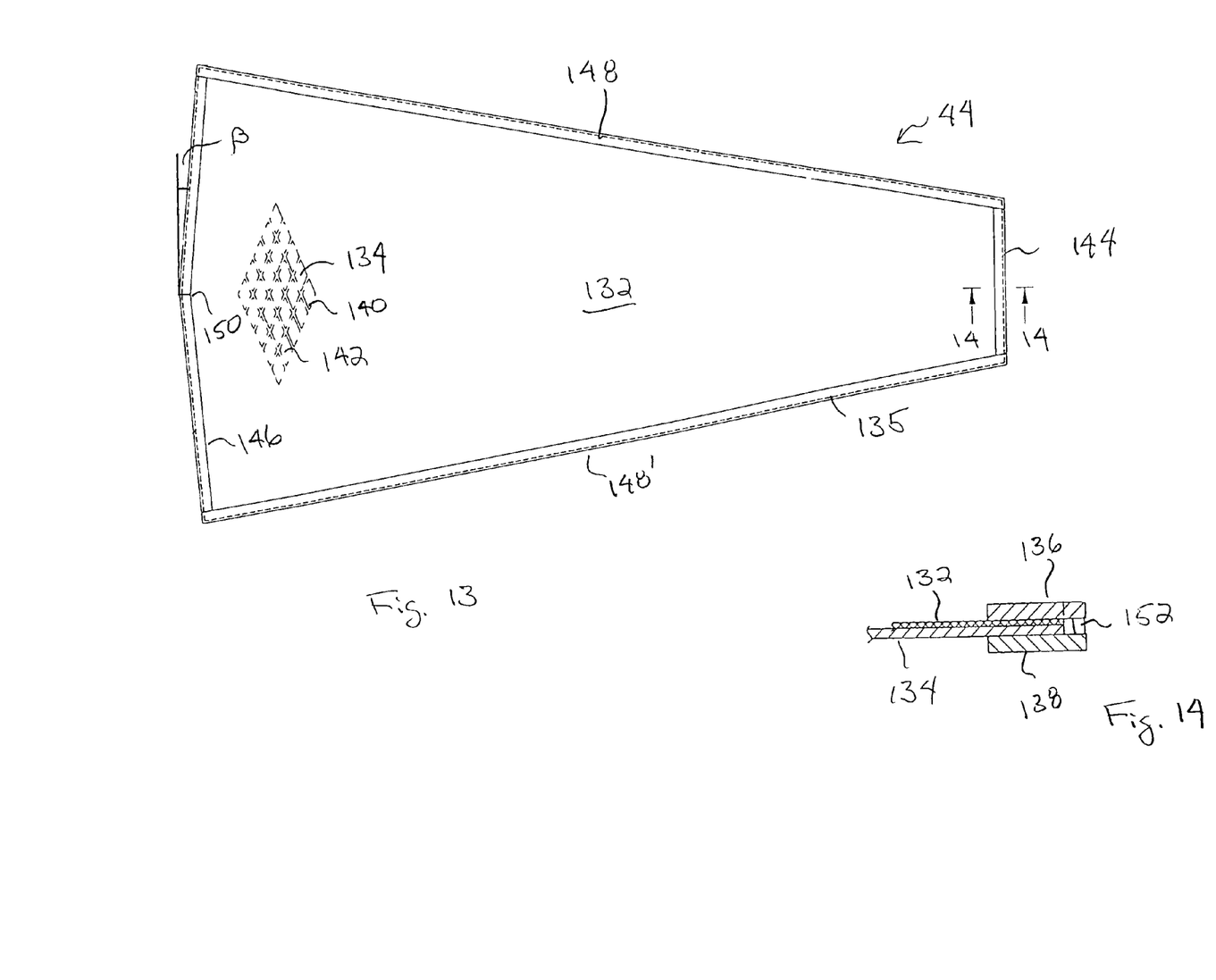
FIG. 13 is an enlarged front view of one of the filter panel assemblies of FIG. 1.
FIG. 14 is an enlarged sectional view, taken along line 14-14 of FIG. 13, illustrating a first embodiment of the frame.
Figure 14:
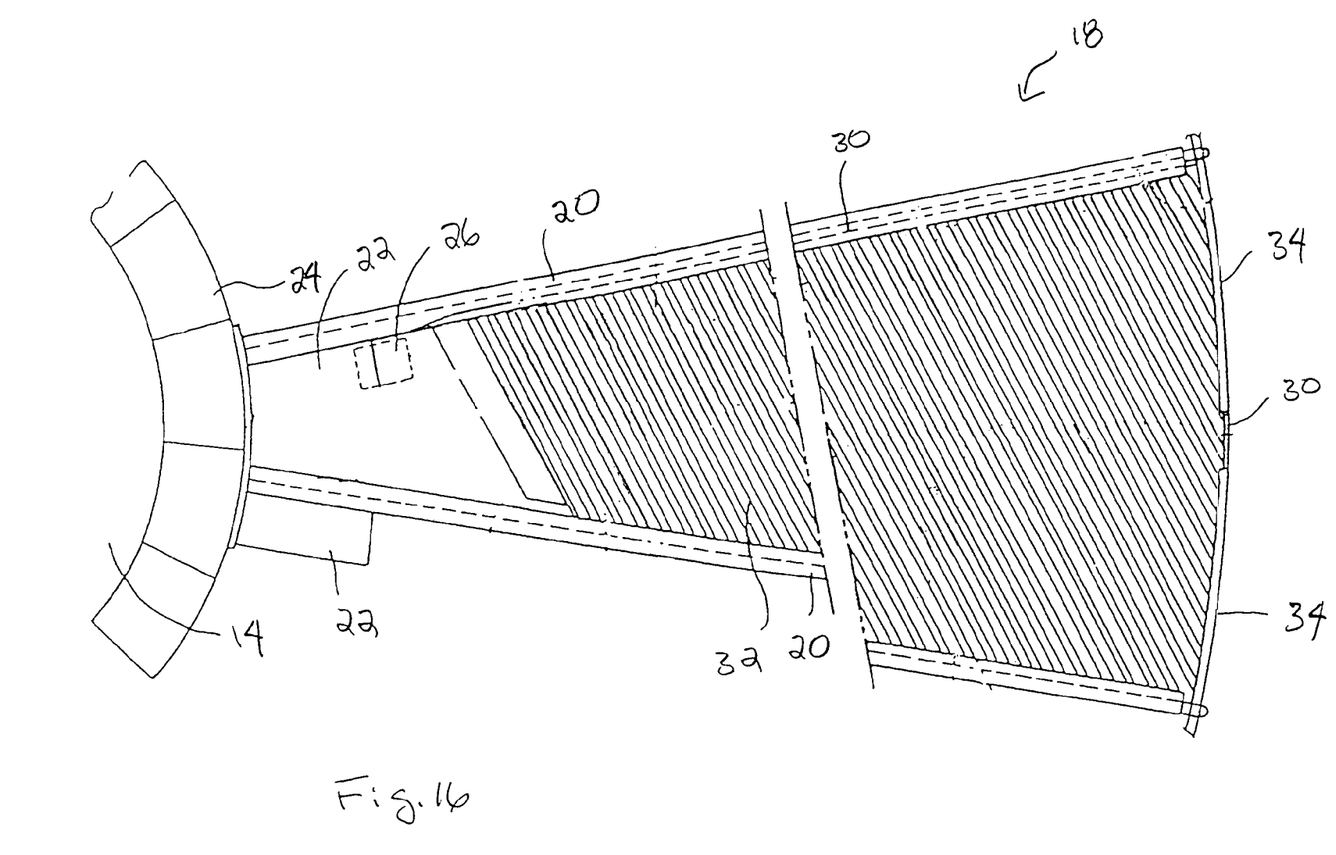

Each filter panel assembly 44 may include a sheet 132 of filter fabric and a sheet 134 of expanded material clamped within a frame 135 (FIG. 13). The expanded material sheet 134 is a web 140 composed of an appropriate metal or polymeric material forming diamond-shaped openings 142. The expanded material sheet 134 is positioned on the downstream side of the filter fabric sheet 132 to provide support to the filter fabric sheet 132. Alternatively, a sheet 132' of stiffened filter fabric may be used without an expanded material backer.

Figure 17:
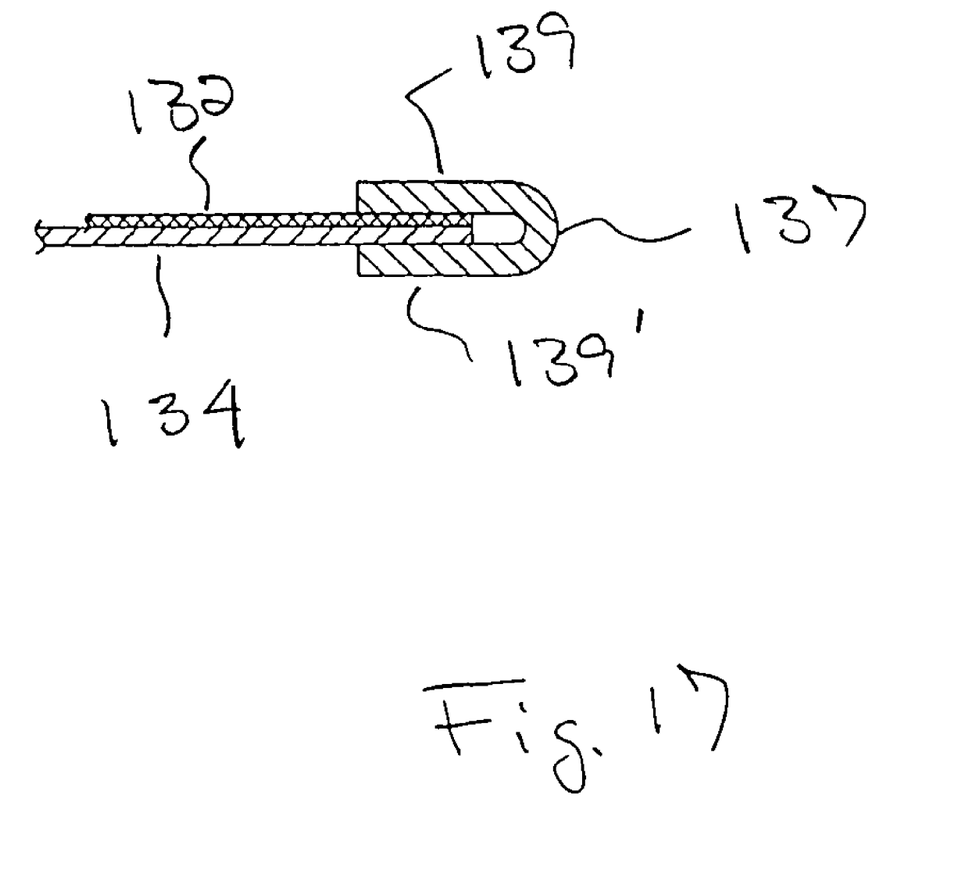
FIG. 17 is an enlarged sectional view, taken along line 14-14 of FIG. 13, illustrating a second embodiment of the frame.

In a first embodiment (FIG. 14), the frame 135 includes substantially identical front and back frames 136, 138, which are mounted together by a number of spot welds 152 along the periphery of the frame 135. The expanded material sheet 134 and the filter fabric sheet 132 are clamped between the front and back frames 136, 138. In a second embodiment (FIG. 17), the frame 135 is a unitary U-shaped clamping member 137 having a pair of legs 139, 139' that are crimped to clamp together the expanded material sheet 134 and the filter fabric sheet 132. The frame 135 includes a radially inner frame segment 144, a radially outer frame segment 146, and first and second side frame segments 148, 148'. The outer frame segment 146 is bent at the center 150, forming an angle $\beta$, where $\beta$ is substantially equal to angle $\alpha$ of the sector assembly outer end plate 50.

Figure 10:
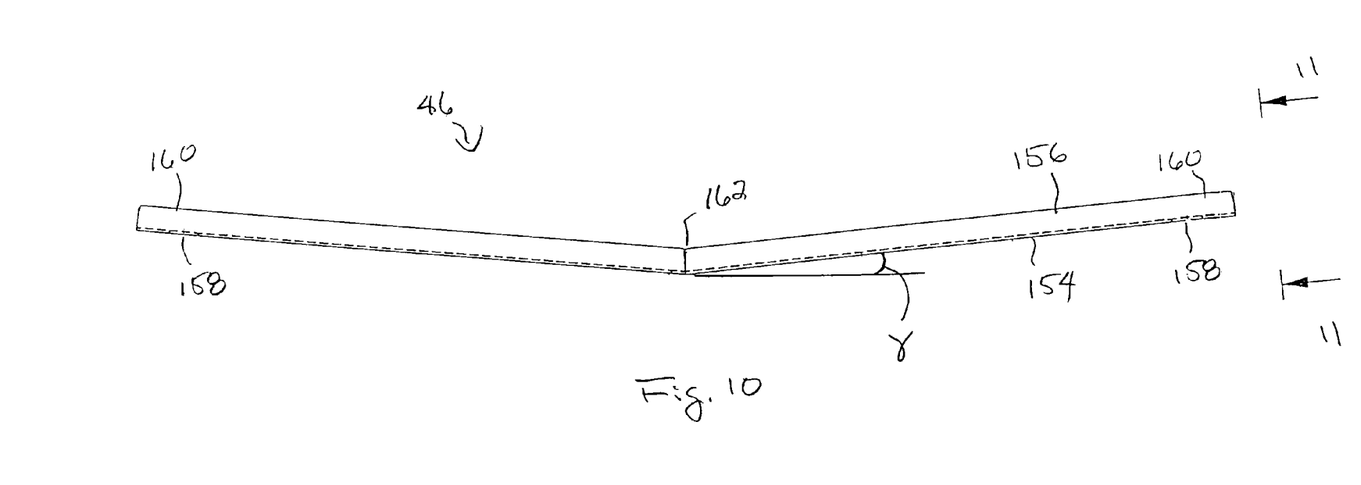
FIG. 10 is an enlarged front view of the top cap of FIG. 1.
Figure 11:
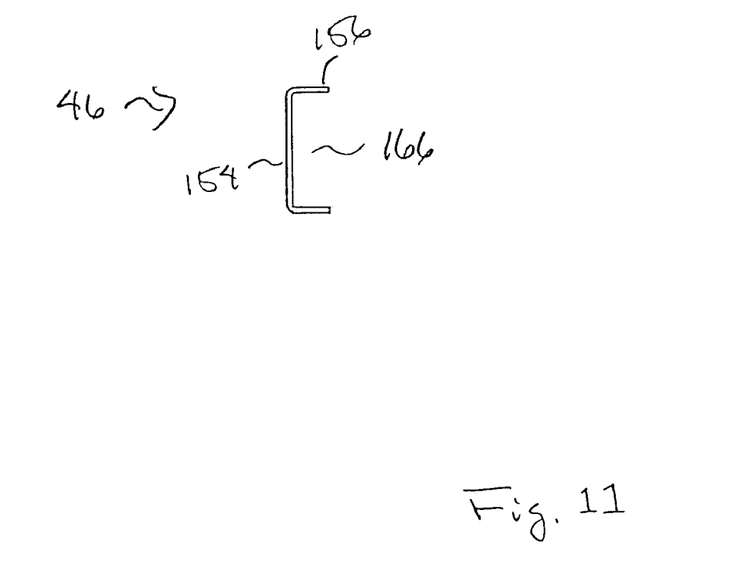
FIG. 11 is an enlarged end view, taken along line 11-11 of FIG. 10.
Figure 12:
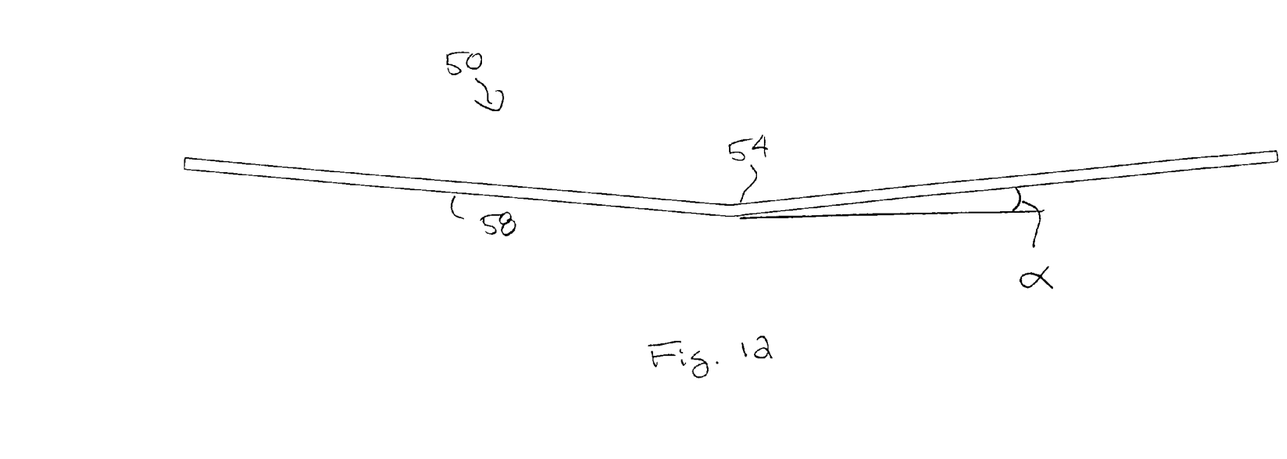
FIG. 12 is an enlarged front view of the outer end plate of FIG. 2.

With reference to FIGS. 10 and 11, the U-shaped top cap 46 includes a base 154 and a pair of legs 156. An opening 158 extends through each of the two end portions 160 of the base 154. The top cap 46 is bent at the center 162, forming an angle $\gamma$, where $\gamma$ is substantially equal to angle $\alpha$ of the sector assembly outer end plate 50.

A new filter is constructed by mounting all of the sector assemblies 42 to the core and then installing the filter panel assemblies 44. The two filter panel assemblies 44 are installed in the uppermost sector assembly 42' by inserting the first and second side frame segments 148, 148' of one of the filter panel assemblies 44 into one of the front or back channels 122, 124 until the inner frame segment 144 of the frame 135 is received within space 76 and the radially inner end of the filter panel assembly 44 contacts shoulder 78. The second filter panel assembly 44 is installed into the other of the front or back channels 122, 124 in the same way. The core is then rotated until the adjacent sector assembly 42" is the uppermost sector assembly and two filter panel assemblies 44 are installed in the subsequent sector assembly 42" in the same manner. The filter panel assemblies 44 of the prior and subsequent sector assemblies 42', 42" are then fixed in place by positioning a top cap 46 over the adjacent sector halves 96, 96', with the threaded stud 56 of the prior sector assembly 42' extending through one of the openings 158 in the top cap 46 and the threaded stud 56' of the subsequent sector assembly 42" extending through the other opening 158 of the top cap 46. A nut 164 is torqued onto the two threaded studs 56, 56' to lock the top cap 46 in place. It should be appreciated that the outer frame segments 146 of the filter panel assemblies 44 installed on the prior and subsequent sector assemblies 42', 42" are received within the channel 166 formed by the legs 156 of the top cap 46. This process is repeated until all of the filter panel assemblies 44 are installed.

A damaged filter panel assembly 44 may be replaced by rotating the core until the sector assembly having the damaged filter panel assembly 44 is the uppermost sector assembly 42'. The four nuts 164, 164', 164", 164''' locking the two top caps 46, 46' fixing the damaged filter panel assembly 44 to the uppermost sector assembly 42' are removed and the two top caps 46, 46' are removed. The outer frame segments 146 of the damaged filter panel assembly 44 may then be grasped and the damaged filter panel assembly 44 withdrawn from the associated front or back channels 122, 124. A replacement filter panel assembly 44 is installed by inserting the first and second side frame segments 148, 148' of the replacement filter panel assembly 44 into the associated front or back channels 122, 124 until the inner frame segment 144 is received within space 76 and the radially inner end of the replacement filter panel assembly contacts shoulder 78. The two top caps 46, 46' and four nuts 164, 164', 164", 164''' are then replaced, completing the repair.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A panel sector for a disc filter for separation of liquids from a suspension, the disc filter being rotatable about a filter axis, being divided into a plurality of sectors, and including a substantially tubular filter core, or rotor; the filter core having a core wall defining an axially extending core channel, a plurality of core inlet fittings, and a plurality of core filtrate channels extending axially through the core wall from the core inlet fittings to the core channel; each panel sector comprising:

front and back filter panel assemblies, each of the filter panel assemblies including
  a frame, and
  a filter material clamped by the frame;
a sector assembly for mounting the front and back filter panel assemblies, the sector assembly including
  a radially outer, outer end plate,
  a radially inner, core mounting plate subassembly adapted for mounting to the disc filter core, or rotor, and having front and back channels for receiving portions of the frames of the front and back filter panel assemblies, respectively,
  first and second side channel subassemblies, each of the side channel subassemblies having front and back channels for receiving portions of the frames of the front and back filter panel assemblies, respectively,
  at least one structural member extending radially between the core mounting plate subassembly and the outer end plate, and
  at least one support member extending laterally between the first and second side channel subassemblies; and a top cap including
  oppositely disposed first and second end portions, and
  first and second halve portions each having front and back channels, the front and back channels of the first half portion receiving portions of the frames of the front and back filter panel assemblies, respectively, mounted in the one of the sector assemblies and the front and back channels of the first half portion receiving portions of the frames of the front and back filter panel assemblies, respectively, mounted in the adjacent sector assembly,
  the top cap first end portion being removably mountable to the second half portion of the outer end plate of a one of the sector assemblies and the top cap second end portion being removably mountable to the first half portion of the outer end plate of an adjacent sector assembly, whereby the front back filter panel is removable from the sector assembly independently from the back filter panel assembly and the back filter panel is removable from the sector assembly independently from the front filter panel assembly.

2. The panel sector of claim 1 wherein the filter material includes a sheet of filter fabric and a sheet of expanded material.

3. The panel sector of claim 2 wherein the expanded material sheet is a web of material forming openings and is positioned on a downstream side of the filter fabric sheet to provide support to the filter fabric sheet.

4. The panel sector of claim 1 wherein the filter material includes a sheet of stiffened filter fabric.

5. The panel sector of claim 1 wherein each frame includes a radially inner frame member, a radially outer frame member, and first and second side frame members.

6. The panel sector of claim 5 wherein the outer end plate of each sector assembly is bent substantially at the center, forming an angle α whereby the outer perimeter of the sector assemblies of a disc filter is substantially a circle, and the outer frame member is bent at the center, forming an angle β, where β is substantially equal to angle α of the sector assembly outer end plate.

7. The panel sector of claim 1 wherein each frame includes front and back frames mounted together by a plurality of spot welds along the periphery of the frame.

8. The panel sector of claim 1 wherein each frame is a unitary U-shaped clamping member having a pair of legs that are crimped to clamp the filter material.

9. The panel sector of claim 1 wherein the top cap is U-shaped, having a base and first and second legs, the first and second legs of the first half portion and the outer end plate of the one of the sector assemblies forming the front and back channels, respectively, of the first half portion when the base of the first half portion is mounted to the outer end plate of the one of the sector assemblies and the first and second legs of the second half portion and the outer end plate of the adjacent sector assembly forming the front and back channels, respectively, of the second half portion when the base of the second half portion is mounted to the outer end plate of the adjacent sector assembly.

10. The panel sector of claim 9 wherein the outer end plate of each sector assembly is bent substantially at the center, forming an angle α whereby the outer perimeter of the sector assemblies of a disc filter is substantially a circle, the sector assembly also includes first and second threaded studs extending radially outward from the outer end plate on either side of the center, the base of the first and second end portions of each top cap defines an opening for receiving a one of the threaded studs, and each panel sector further comprises first and second nuts which are threadably mountable on the first and second threaded studs, respectively.

11. The panel sector of claim 10 wherein the top cap is bent substantially at the center, forming an angle γ, where γ is substantially equal to angle α of the sector assembly outer end plate.

12. The panel sector of claim 1 wherein the core mounting plate subassembly includes a core mounting plate defining a central opening, the core mounting plate being adapted for mounting to the disc filter core, or rotor, and the central opening being adapted for providing fluid communication with a one of the core inlet fittings.

13. The panel sector of claim 12 wherein the core mounting plate subassembly also includes front and back shrouds extending radially outward from an inner end, mounted to the core mounting plate, to an outer portion, the front and back shrouds defining a space therebetween, a radially inner portion of the at least one structural member being disposed between the outer portions of the front and back shrouds.

14. The panel sector of claim 13 wherein the outer portions of the front and back shrouds each have inner and outer segments forming a shoulder on each of the shrouds, the radially inner portion of the at least one structural member being mounted to the inner segments of the front and back shrouds, the at least one structural member and the shoulders and outer segments of the front and back shrouds defining the front and back channels.

15. The panel sector of claim 1 wherein the sector assembly includes a plurality of structural members and a front pair of support members and a back pair of support members, each of the support members having a zig-zag shape defining inner and outer bend portions, each of the support members extending radially between the core mounting plate subassembly and the outer end plate and extending laterally from a one of the side channel subassemblies to a position substantially equidistant from both side channel subassemblies.

16. The panel sector of claim 15 wherein each of the support members and each of the structural members have front and back surfaces, the support members being received in notches in the front surfaces of the back pair of structural members and notches in the back surfaces of the front pair of structural members, whereby the front surfaces of the structural members and the front surfaces of the front pair of support members are substantially co-planar and the back surfaces of the structural members and the back surfaces of the back pair of support members are substantially co-planar.

17. The panel sector of claim 15 wherein each of the structural members and each of the support members has a radially outer end mounted to the outer end plate and a radially inner portion mounted to the core mounting plate subassembly.

18. The panel sector of claim 1 wherein each of the side channel subassemblies includes U-shaped inside and outside channel members, each of the channel members having a base, a front leg and a back leg, the inside channel member being mounted within the outside channel member, the front legs of the inside and outside channel members defining the front channel and the back legs of the inside and outside channel members defining the back channel.

19. The panel sector of claim 18 wherein the inside and outside channel members each have a radial length, the radial length of the inside channel member being greater than the radial length of the outside channel member, whereby inner and outer end portions of the inside channel member extend radially beyond the outside channel member, the inner end portion of the inside channel member of each side channel subassembly being mounted to the core mounting plate subassembly, the outer end portion of the inside channel member of each side channel subassembly being mounted to the outer end plate.

20. A panel sector for a disc filter for separation of liquids from a suspension; the disc filter being rotatable about a filter axis; the disc filter being divided into a plurality of sectors, each of the sectors having an associated panel sector; the disc filter including a substantially tubular filter core, or rotor; the filter core having a core wall defining an axially extending core channel, a plurality of core inlet fittings, and a plurality of core filtrate channels extending axially through the core wall from the core inlet fittings to the core channel; each panel sector comprising:

front and back filter panel assemblies, each of the filter panel assemblies including a frame, and a filter material clamped by the frame;

a sector assembly for removably mounting the front and back filter panel assemblies, the sector assembly including a radially outer, outer end plate having a substantially center bend forming first and second halve portions defining an angle α, whereby the outer perimeter of the sector assemblies of a disc filter substantially defines a circle, a radially inner, core mounting plate subassembly comprising a core mounting plate defining a central opening, the core mounting plate being adapted for mounting to the disc filter core, or rotor, and the central opening being adapted for providing fluid communication with a one of the core inlet fittings, and front and back shrouds defining a space therebetween, each shroud extending radially outward from an inner end, mounted to the core mounting plate, to an outer portion having inner and outer segments forming a shoulder, first and second side channel subassemblies, each of the side channel subassemblies including a U-shaped inside channel member having a base, a front leg and a back leg, a U-shaped outside channel member having a base, a front leg and a back leg, the inside channel member being mounted within the outside channel member, the front legs of the inside and outside channel members and the back legs of the inside and outside channel members defining front and back channels, respectively, for receiving portions of the frames of the front and back filter panel assemblies;

a plurality of structural members, each of the structural members having a radially outer end mounted to the outer end plate and a radially inner portion mounted to the core mounting plate subassembly, and a plurality of support members, each of the support members having a radially outer end mounted to the outer end plate and a radially inner portion mounted to the core mounting plate subassembly; and a top cap including oppositely disposed first and second end portions, and a substantially center bend forming first and second halve portions defining an angle γ, where γ is substantially equal to angle α of the sector assembly outer end plate, the first and second halve portions each having front and back channels, the front and back channels of the first half portion receiving portions of the frames of the front and back filter panel assemblies, respectively, mounted in the one of the sector assemblies and the front and back channels of the first half portion receiving portions of the frames of the front and back filter panel assemblies, respectively, mounted in the adjacent sector assembly, the top cap first end portion being removably mountable to the second half portion of the outer end plate of a one of the sector assemblies and the top cap second end portion being removably mountable to the first half portion of the outer end plate of an adjacent sector assembly, whereby the front back filter panel is removable from the sector assembly independently from the back filter panel assembly and the back filter panel is removable from the sector assembly independently from the front filter panel assembly.

21. The panel sector of claim 20 wherein the radially inner portion of each structural member extends radially through the outer segments of the front and back shrouds and is mounted to the inner segments of the front and back shrouds, the structural members and the shoulders and outer segments of the front and back shrouds defining front and back channels for receiving portions of the frames of the front and back filter panel assemblies, respectively.

22. The panel sector of claim 21 wherein inner and outer end portions of the inside channel member extend radially beyond the outside channel member, the inner end portion of the inside channel member of each side channel subassembly extending radially through the outer segments of the front and back shrouds and being mounted to the inner segments of the front and back shrouds, the outer end portion of the inside channel member of each side channel subassembly being mounted to the outer end plate.

23. The panel sector of claim 22 wherein each of the support members have a zig-zag shape, defining inner and outer bend portions, the support members defining a front pair of support members and a back pair of support members, a first support member of each pair extending from the first side channel subassembly to a position substantially equidistant from both side channel subassemblies and a second support member of each pair extending from the second side channel subassembly to a position substantially equidistant from both side channel subassemblies.

24. The panel sector of claim 23 wherein each of the legs of each of the inside channel members has an inner end; the support member radially outer ends, the support member radially inner portions, and the support member outer bend portions being mounted to the inner ends of the legs of an associated inside channel member.

25. The panel sector of claim 20 wherein each panel sector further comprises first and second nuts; the sector assembly also includes first and second threaded studs, extending radially outward from the outer end plate on either side of the center; and the top cap is U-shaped, having a base and first and second legs, the first and second end portions of the base of the top cap each defining an opening for receiving a one of the threaded studs, the first and second nuts being threadably mountable on the first and second threaded studs, respectively.

26. The panel sector of claim 20 wherein the top cap is U-shaped, having a base, a first leg and a second leg defining a cavity; the second half portion of the outer end plate of the one of the sector assemblies being received within the cavity of the end cap first half portion, to form the front and back channels, respectively, of the end cap first half portion; and the first half portion of the outer end plate of the adjacent sector assembly being received within the cavity of the end cap second half portion, to form the front and back channels, respectively, of the end cap second half portion.

27. The panel sector of claim 20 wherein the filter material is a composite filter material comprising a sheet of filter fabric and a sheet of expanded material.

* * * * *